United States Patent
Crowley

(10) Patent No.: US 8,876,055 B2
(45) Date of Patent: Nov. 4, 2014

(54) AIRCRAFT REFUELLING SYSTEM

(75) Inventor: Michael Crowley, Frampton on Severn (GB)

(73) Assignee: Airbus Operations Limited, Bristol (GB)

( * ) Notice: Subject to any disclaimer, the term of this patent is extended or adjusted under 35 U.S.C. 154(b) by 1956 days.

(21) Appl. No.: 11/727,075

(22) Filed: Mar. 23, 2007

(65) Prior Publication Data

US 2008/0173762 A1 Jul. 24, 2008

(30) Foreign Application Priority Data

Mar. 28, 2006 (GB) .................................. 0606200.4

(51) Int. Cl.
*B64D 37/00* (2006.01)
*B64D 37/16* (2006.01)
*B64D 37/20* (2006.01)
*B64D 39/00* (2006.01)

(52) U.S. Cl.
CPC ................. *B64D 37/20* (2013.01); *Y02T 50/44* (2013.01); *B64D 37/16* (2013.01)
USPC ...................................... 244/135 A; 137/505

(58) Field of Classification Search
USPC ............................................ 244/135 A, 1 TD
See application file for complete search history.

(56) References Cited

U.S. PATENT DOCUMENTS

| | | | | |
|---|---|---|---|---|
| 2,771,090 A | * | 11/1956 | Smith et al. | 137/390 |
| 3,169,667 A | * | 2/1965 | Headrick | 222/23 |
| 3,383,078 A | * | 5/1968 | Shohet et al. | 244/135 R |
| 3,421,717 A | * | 1/1969 | Di Piro | 244/17.11 |
| 3,432,121 A | * | 3/1969 | Delaney | 244/17.11 |
| 3,476,140 A | * | 11/1969 | Jusyk | 137/392 |
| 3,605,788 A | | 9/1971 | Brown | |
| 3,669,136 A | * | 6/1972 | Parenti | 137/113 |
| 3,981,321 A | * | 9/1976 | Risse et al. | 137/255 |
| 4,567,924 A | | 2/1986 | Brown | |
| 6,182,688 B1 | * | 2/2001 | Fabre | 137/503 |
| 6,234,224 B1 | * | 5/2001 | Schultz, Jr. | 141/384 |
| 6,347,639 B1 | * | 2/2002 | Thompson | 137/15.08 |

(Continued)

FOREIGN PATENT DOCUMENTS

| | | |
|---|---|---|
| DE | 40 11 059 | 10/1991 |
| GB | 825373 | 12/1959 |

OTHER PUBLICATIONS

UK Search Report for GB 0606200.4, date of search Jul. 26, 2006.

*Primary Examiner* — Brian M O'Hara
(74) *Attorney, Agent, or Firm* — Nixon & Vanderhye P.C.

(57) ABSTRACT

An aircraft refuelling system of an aircraft is provided. The refuelling system comprises a refuelling connector (34) mounted as part of the aircraft and configured to detachably connect to the fuel outlet (2) of a fuel supply apparatus separate from the aircraft, and a fuel pressure regulator (36) having an inlet in communication with a fuel inlet (35) of the refuelling connector (34) and having an outlet in communication with refuelling pipework (39) of the aircraft. The fuel pressure regulator (36), regulates the pressure of fuel in the refuelling pipework (39) when fuel is being passed into the refuelling pipework (39) from the fuel inlet (35) of the refuelling connector. A fuel pressure regulator apparatus for mounting in an aircraft, comprising a connector forming a fuel inlet to the fuel pressure regulator apparatus, configured to detachably connect to the fuel outlet of a fuel supply system, a fuel outlet for connection to the refuelling pipework of an aircraft and a fuel pressure regulator for regulating the pressure of fuel passing through the fuel outlet is also provided.

15 Claims, 4 Drawing Sheets

(56) References Cited

U.S. PATENT DOCUMENTS

| | | | |
|---|---|---|---|
| 6,736,354 B2 * | 5/2004 | Goto et al. | 244/135 C |
| 6,997,415 B2 * | 2/2006 | Wozniak et al. | 244/135 C |
| 7,458,543 B2 * | 12/2008 | Cutler et al. | 244/135 A |
| 2006/0278761 A1 * | 12/2006 | Cutler et al. | 244/135 A |
| 2008/0149772 A1 * | 6/2008 | Sandiford et al. | 244/135 R |

* cited by examiner

AIRCRAFT REFUELLING SYSTEM

BACKGROUND OF THE INVENTION

This application claims priority to GB Application No. 0606200.4 filed 28 Mar. 2006, the entire contents of which are incorporated herein by reference.

The present invention relates to refuelling/defuelling equipment on board an aircraft, particularly but not necessarily exclusively, an aircraft having onboard refuelling/defuelling equipment comprising internal fuel-flow restrictors.

Aircraft are refuelled at airports between flights with the amount of fuel required to complete their next flight. In order to maximise the revenue generated by an aircraft it is desirable to maximise the flying time of the aircraft and minimise the time spent on the ground between flights. The time spent refuelling an aircraft is a significant contributor to the time required between flights and therefore it is desirable to minimise that refuelling time.

Aircraft are refuelled using ground equipment such as that shown in FIG. 1. An aircraft's refuelling system is connected to a fuel hose 1 by a hose end coupling 2 and fuel is pumped from a fuel storage tank 3 by fuel pump 4 into the aircraft. Two stages of pressure regulation are provided in the ground equipment, namely a first fuel pressure regulator 5 which regulates the pressure to approximately 60 psig and a second adjustable fuel pressure regulator 6, typically integral with the hose end coupling 2, which further reduces the pressure to an adjustable value, typically in the range of 30 to 50 psig.

FIG. 2 shows a conventional refuelling connector 20 for mounting on an aircraft. A fuel outlet 21 connects to the refuelling pipework of the aircraft and fuel inlets 22 and 23 each provide a detachable connection to a hose end coupling 2. The fuel hose used to connect the ground equipment to the aircraft may limit the flow rate of fuel and so two inlets are provided to allow two hoses to be used in parallel, thereby increasing that flow rate. Each refuelling connector has a sealing mechanism 24 such that the inlet is sealed when no hose is connected. The two inlets 22 and 23 combine at isolation valve 25 from where fuel can pass out of the outlet 21 and into the refuelling system of the aircraft. Such a refuelling connector, having two fuel inlets, is typically utilised on larger aircraft where the volume of fuel to be transferred is large. For smaller aircraft a refuelling connector operating on the same principles, but having only one fuel inlet, is often used.

During refuelling, air in the aircraft's fuel tanks is forced out of the tanks through a vent system, venting through flame arrestors to the exterior of the aircraft. Due to resistance to the flow of air in the vent pipework the pressure in the fuel tanks rises during refuelling. If an overflow occurs and fuel is forced through the vent system the pressure increase is higher due to the increased drag of fuel through the vent system. Aircraft fuel tanks are typically designed to have a strength that is sufficient to safely accommodate these pressure increases in the overflow condition. Thus the fuel tanks must be constructed more strongly than would be the case if they simply had to contain fuel. This increase in strength leads to an increase in weight and size of the tanks, which is undesirable as it reduces aircraft performance and design freedom. It is therefore advantageous to limit the pressure increases and thereby limit the added strength and weight required. An aircraft's fuel tanks are thus designed to contain a certain pressure, and that pressure must not be exceeded at any point. During aircraft operation, the highest pressure rise in the fuel tanks may be that sustained during the above-described overflow condition. As such, overflow during refuelling may be the limiting design case.

The pressure rise in the fuel tanks during refuelling is dependent upon the rate of fuel flow into the tanks from the refuelling apparatus. In order to limit the pressure rise during refuelling, fuel flow restrictors are typically included into the refuelling pipework. The fuel flow restrictors are designed to provide, in the overflow condition, the maximum tolerable fuel flow rate at the maximum possible fuel supply pressure. The fuel supply pressure to the aircraft is defined by the adjustable fuel pressure regulator 6 in the hose end coupling of the ground equipment. The typical adjustable pressure regulator 6 is able to be set to limit the fuel pressure to a pressure in the range of 30 to 50 psig. It is therefore assumed that the fuel pressure may be as high as 50 psig. A further safety margin of 10% is then applied to this pressure so that the maximum fuel supply pressure, for the purposes of designing the fuel flow restrictors, is assumed to be 55 psig. The fuel flow restrictors are therefore designed such that the pressure rise in the fuel tanks in the overflow condition is within the required limits at a fuel supply pressure of 55 psig.

Although the maximum supply pressure is assumed to be as high as 55 psig, it is more commonly between 30 psig and 40 psig. At those lower fuel supply pressures the fuel flow restrictors act to limit the flow rate. The refuelling time of the aircraft is therefore longer than could be achieved if the fuel flow restrictors were removed or were less restrictive.

SUMMARY OF THE INVENTION

The present invention seeks to provide an aircraft refuelling system that allows the refuelling rate to be increased while not prejudicing the safety of the fuel tank integrity during refuelling in the overflow condition. Alternatively or additionally, the present invention seeks to provide an improved aircraft refuelling/defuelling system.

The present invention provides an aircraft refuelling system of an aircraft, the system comprising a refuelling connector mounted as part of the aircraft and configured to detachably connect to the fuel outlet of a fuel supply apparatus separate from the aircraft, and a fuel pressure regulator having an inlet in communication with a fuel inlet of the refuelling connector and having an outlet in communication with refuelling pipework of the aircraft, wherein the fuel pressure regulator, in use, regulates the pressure of fuel in the refuelling pipework when fuel is being passed into the refuelling pipework from the fuel inlet of the refuelling connector.

Such an aircraft refuelling system advantageously reduces the refuelling time of the aircraft since the maximum fuel pressure in the refuelling pipework is determined by the fuel pressure regulator and no allowance needs to be made for possible variations in the supply pressure of the fuel from any external fuel supply apparatus used to supply fuel to the refuelling connector. In other words, the aircraft refuelling system ensures that the fuel supply is at, or below, a known pressure upon entry to the aircraft and is not dependent upon the pressure settings of ground equipment, which may vary from one location to another. The aircraft refuelling system can therefore be designed to operate at the actual maximum fuel pressure (i.e. the actual fuel pressure and the maximum fuel pressure are the same during refuelling), thereby reducing the refuelling time.

In arriving at the present invention the possibility of reducing the pressure rise in the fuel tanks by the use of larger vent pipework and larger flame arrestors was considered, thereby allowing higher flow rates. However, the use of larger parts requires the design of the aircraft to be compromised, for example by encroaching on the space typically used for fuel tanks, possibly resulting in a reduction in performance due to an increase in size and/or weight. Embodiments of the present invention, however, may have the advantage that they do not require the use of such larger components and therefore no design compromise need be enforced to achieve lower refuelling times.

It is well-known in the art to use the same systems for both refuelling and defuelling an aircraft. It will therefore be understood for example that the term 'refuelling system' is used herein to refer to a refuelling system and a refuelling/defuelling system.

The aircraft refuelling system may also comprise a fuel flow restrictor mounted in the refuelling pipework to restrict the flow of fuel through the refuelling pipework. There may be a plurality of fuel flow restrictors.

The size of the fuel flow restrictor may be such that the maximum flow rate that would be allowed by the fuel flow restrictor at a fuel supply pressure equal to 45 psig in the absence of the pressure regulator, is greater than the maximum flow rate that can be safely sustained by the fuel tanks in the overflowing condition. The size of the fuel flow restrictor may be such that the maximum flow rate that would be allowed by the fuel flow restrictor at a fuel supply pressure equal to 55 psig (or preferably 50 psig, or even 45 psig, or an even lower pressure, for example 40 psig) in the absence of the pressure regulator, is greater than the maximum flow rate that can be safely sustained by the fuel tanks in the overflowing condition.

Also, the size of the fuel flow restrictor may be such that the maximum flow rate that would be allowed by the fuel flow restrictor at a fuel supply pressure equal to 125% of the maximum pressure allowed by the pressure regulator in the absence of the pressure regulator is greater than the maximum flow rate that can be safely sustained by the fuel tanks in the overflowing condition. The size of the fuel flow restrictor may be such that the maximum flow rate that would be allowed by the fuel flow restrictor at a fuel supply pressure equal to 150% (or even 133%, or possibly even 200%) of the maximum pressure allowed by the pressure regulator in the absence of the pressure regulator is greater than the maximum flow rate that can be safely sustained by the fuel tanks in the overflowing condition.

It will therefore be understood that the size of the fuel flow restrictor may allow the pressure that can be safely sustained by the fuel tanks in the overflowing condition to be exceeded, in the absence of the fuel pressure regulator, at higher or lower pressures than 50 psig, for example pressures in the range 40-60 psig, or 110-200% of the maximum pressure allowed by the regulator.

The size of the fuel flow restrictor may be determined by the maximum fuel pressure allowed by the fuel pressure regulator. For example, the size of the fuel flow restrictor may be determined on the basis that the fuel pipework pressure will not be greater than a pressure in the range of about 30 to about 50 psig, or more preferably in the range of about 30 to about 40 psig. Embodiments of the present invention may thus be able to be provided with fuel flow restrictors that allow faster fuel flows than would otherwise be practical if no pressure regulator were provided.

Preferably, the fuel pressure regulator is set to regulate the fuel pressure in the refuelling pipework to between 15 psig and 50 psig. Preferably, the fuel pressure regulator is set to regulate the fuel pressure in the refuelling pipework to between 25 psig and 50 psig, and more preferably in a range between 35 and 45 psig.

The refuelling connector may have more than one fuel inlet.

The fuel pressure regulator may be a fixed regulator. The fuel pressure regulator may be mounted local to the refuelling connector. The fuel pressure regulator may for example form a part of the refuelling connector.

The present invention is of particular use on large aircraft. The aircraft may be heavier than 50 tonnes dry weight, and more preferably heavier than 200 tonnes dry weight. The aircraft may be of a size equivalent to an aircraft designed to carry more than 75 passengers, and more preferably more than 200 passengers.

The present invention also provides a fuel pressure regulator apparatus for mounting in an aircraft, comprising
a connector forming a fuel inlet to the fuel pressure regulator apparatus, configured to detachably connect to the fuel outlet of a fuel supply system,
a fuel outlet for connection to the refuelling pipework of an aircraft, and
a fuel pressure regulator for regulating the pressure of fuel passing through the fuel outlet.

The fuel pressure regulator apparatus may have a plurality of connectors.

The fuel pressure regulator may be configured to regulate the fuel pressure to a maximum pressure, the maximum pressure being between 15 psig and 50 psig. Preferably, the maximum pressure is between 25 psig and 50 psig, and more preferably in a range between 35 and 45 psig.

The fuel pressure regulator may be a fixed regulator.

The present invention also provides a method of refuelling an aircraft, comprising the steps of
supplying fuel to a fuel inlet of an aircraft at a first pressure,
regulating the pressure of that fuel to a second level with a fuel pressure regulator forming part of the fuel system of the aircraft, and
supplying the regulated fuel to fuel tanks of the aircraft.

Fuel may be supplied to the fuel inlet of an aircraft by means of a fuel hose comprising a further fuel pressure regulator, for example at its outlet.

It will be appreciated that features described in respect of one aspect of the invention are equally applicable to other aspects of the invention. For example, features described with reference to the aircraft refuelling system may be incorporated in the fuel pressure regulator apparatus.

DESCRIPTION OF THE DRAWINGS

An embodiment of the present invention will now be described by way of example with reference to the accompanying drawings, of which.

DETAILED DESCRIPTION

The embodiment of the invention provides an improved aircraft refuelling system to allow faster refuelling times.

Figure 3:
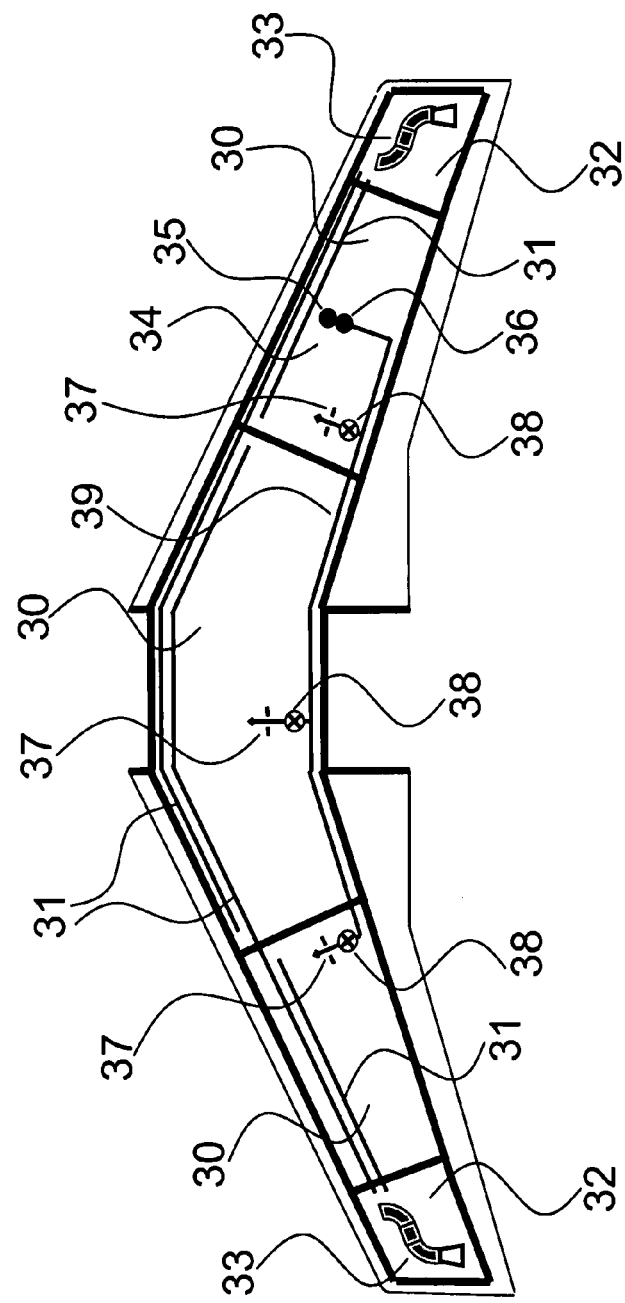
FIG. 3 shows an aircraft refuelling system according to an embodiment of the present invention.

FIG. 3 is a schematic diagram of an aircraft refuelling system according to an embodiment of the present invention.

The aircraft has fuel tanks 30 located in the fuselage and wings, which tanks are connected to vent pipework 31 to allow air (or inert gas) to flow out of the tanks 30. In the case of fuel overflow, fuel may be caused to flow through the vent pipework 31 as it is forced out of the fuel tanks 30. Two vent pipes are provided for the centre tank, each having an inlet at one side of the centre tank and an outlet to the vent tank located on the opposite side of the aircraft to the inlet. The vent pipework 31 is open to vent tanks 32 such that fuel passing through the vent pipework during an overflow is caught by the vent tanks 32. The pipework also vents to the exterior of the aircraft via flame arrestors 33 to allow air to escape from the fuel tanks during refuelling, without any risk of an explosion in the fuel tanks due to combustion of the expelled air (which will contain fuel vapour due to evaporation within the tanks) outside of the aircraft.

Inlets to the fuel tanks are connected to a refuelling connection 34 by refuelling pipework 39. Refuelling connection 34 comprises an inlet connector 35 to connect to a separate fuel supply system and a fuel pressure regulator 36 to regulate the pressure of the fuel in the refuelling pipework 39. Fuel flow restrictors 37 are mounted in the refuelling pipework 39 and restrict the flow rate of fuel from the refuelling pipework 39 into the fuel tanks. Refuel valves 38 allow each tank to be disconnected from the refuelling pipework 39 such that fuel can be directed as required. The embodiment of the invention has a plurality of fuel flow restrictors, but it also possible to use a single fuel flow restrictor, appropriately located, to provide suitable flow restriction. For example, a fuel flow restrictor could be located local to the refuelling connection 34 such that the flow of fuel to all fuel tanks is restricted.

As is explained above the size of the fuel flow restrictors is defined at the maximum fuel pressure that may be experienced in the refuelling pipework 39. In conventional refuelling systems this fuel pressure is defined by the fuel pressure regulator in the external refuelling apparatus, but in the present embodiment of the invention the maximum pressure in the refuelling pipework 39 is defined by the fuel pressure regulator 36 on board the aircraft and the restrictor sizes are therefore defined by that pressure.

In conventional refuelling systems the fuel flow restrictors are sized according to a maximum fuel pressure of 55 psig. Since the actual supply pressure is typically significantly less than that maximum, refuelling times were extended as the flow rates were unnecessarily restricted by the fuel flow restrictors. In the fuel system of the present embodiment the fuel pressure regulator 36 is set to a pressure close to the actual likely supply pressure. In an example embodiment of the invention the fuel pressure regulator prevents the fuel pressure from exceeding 40 psig and the likely fuel supply pressures are in the range 30 psig to 40 psig. In a further example embodiment of the invention (not separately illustrated) the fuel pressure regulator prevents the fuel pressure from exceeding 15 psig.

The fuel flow restrictors required to provide the required flow rate (in the fuel overflow condition) at 40 psig are larger (i.e. less restrictive) than those required at 55 psig and therefore at a given pressure the flow rate will be higher. This higher flow rate reduces the refuelling time of the aircraft, thereby reducing the turnaround time and improving profitability. If the fuel pressure regulator were omitted and fuel were supplied at 60 psig (that is, 150% of the maximum pressure permitted by the fuel pressure regulator), the pressure in the fuel tanks in an overflow condition would be greater than the assumed maximum safe limit for the structural integrity of the fuel system.

Figure 4:
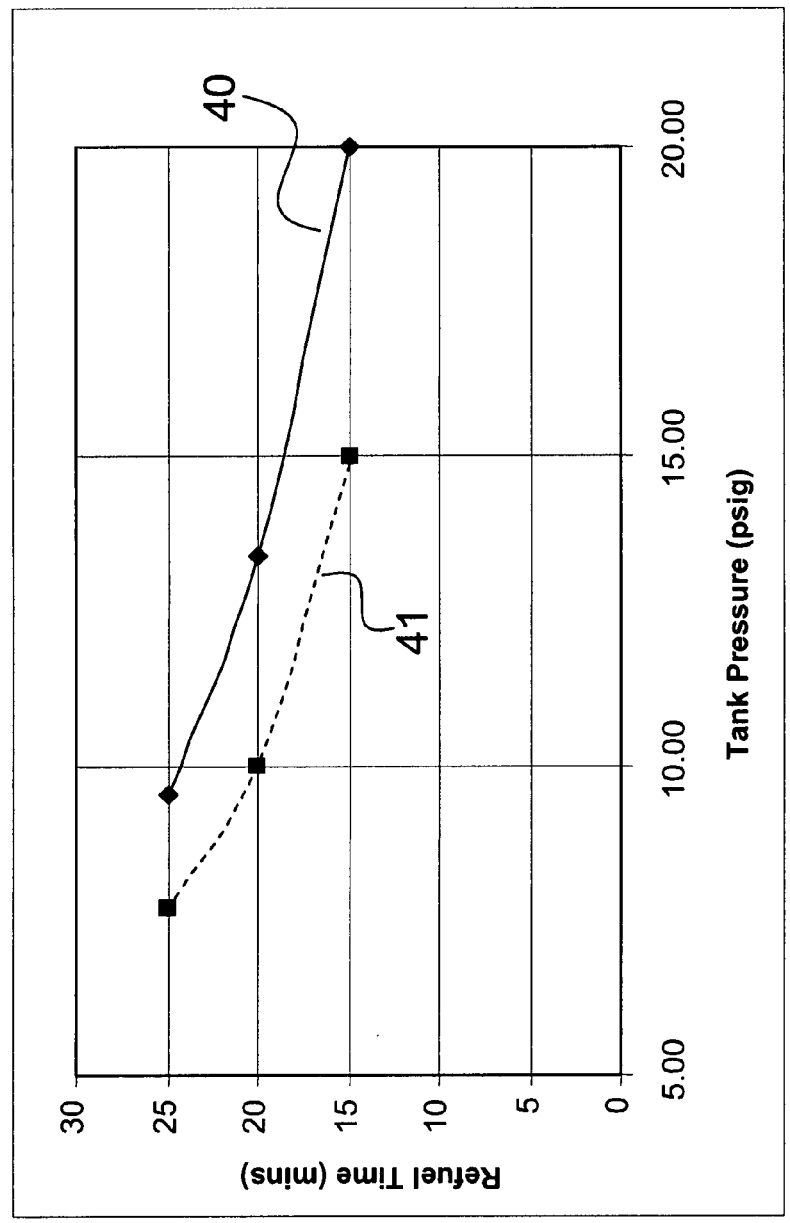
FIG. 4 shows a chart showing the improvement in refuelling time due to the embodiment of FIG. 3.

FIG. 4 shows a chart of the refuel time against tank pressure during fuel overflow for two cases for an example aircraft. In both cases the fuel supply pressure was 40 psig. In the first case, shown by the solid line 40, the fuel flow restrictors have been sized in the conventional manner to allow for a maximum fuel supply pressure of 55 psig, whereas in the second case, shown by the dotted line 41 the fuel restrictors have been sized according to the present embodiment of the invention, based on a maximum fuel supply pressure of 40 psig. At a maximum tank pressure of 15 psig the refuel time is reduced from 18 minutes to 15 minutes by the embodiment. Similar improvements in refuel time will also be obtained if the actual refuel pressure is lower than 40 psig.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

Figure 1:
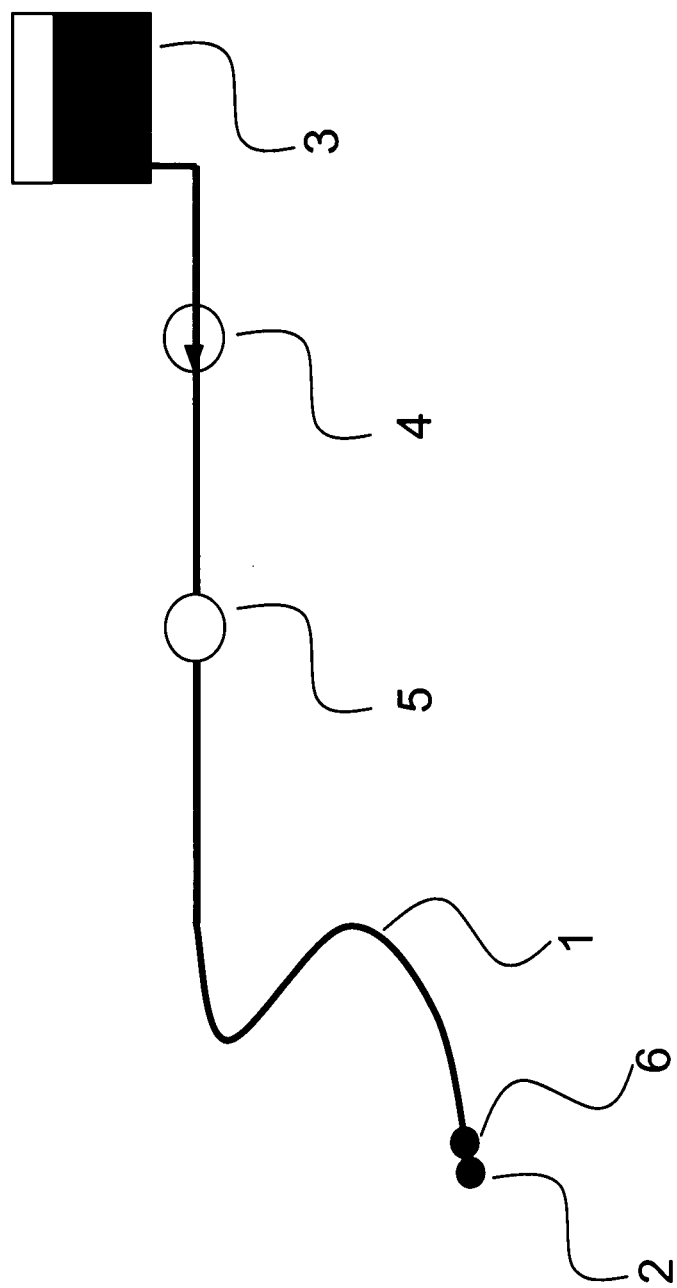
FIG. 1 shows a typical ground refuelling system for refuelling aircraft.
Figure 2:
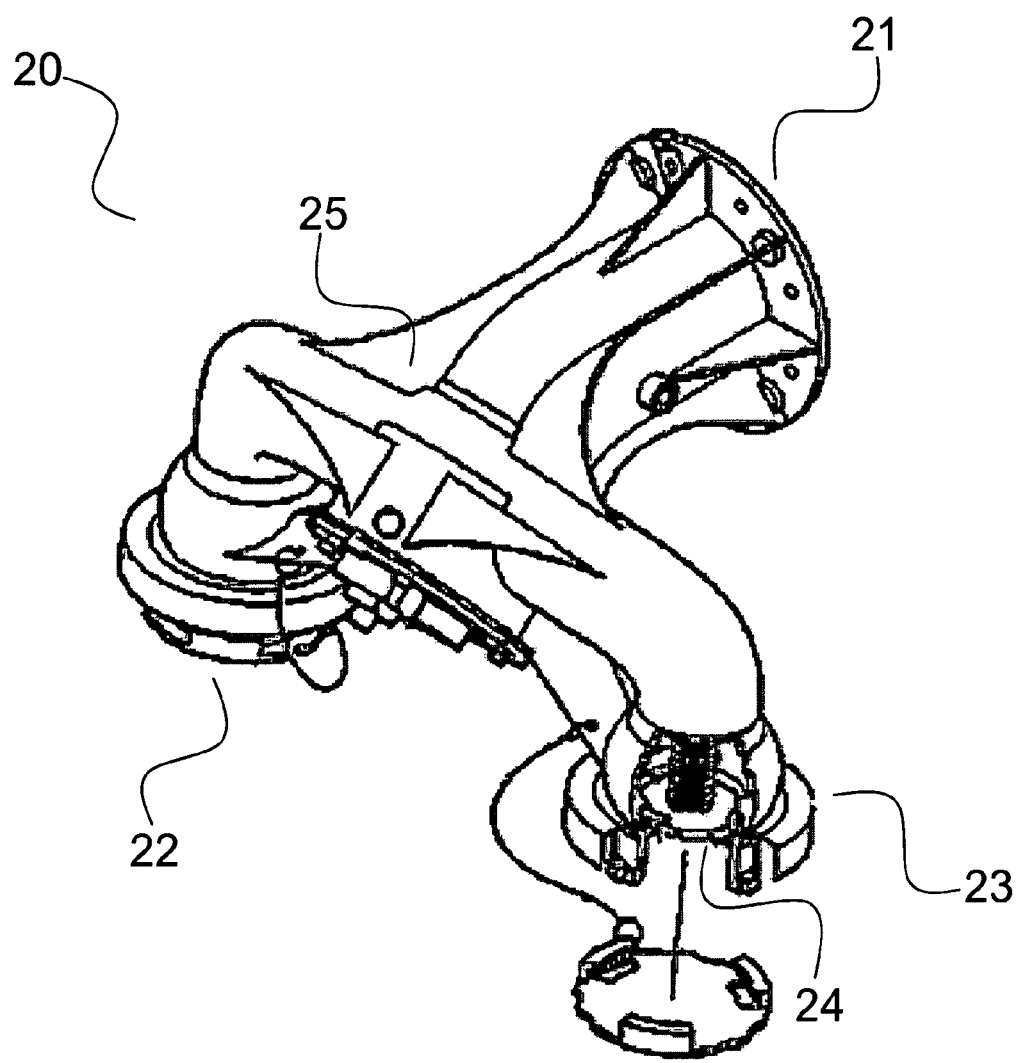
FIG. 2 shows a refuelling connector having two fuel inlets.

In the embodiment of the invention the fuel pressure regulator forms part of the refuelling connection. The combination of a refuelling connection and a fuel pressure regulator may also be provided by connecting the outlet of a fuel inlet connection, such as that shown in FIG. 2, to the inlet of a conventional fuel pressure regulator, such that fuel enters the refuelling pipework of the aircraft through the fuel pressure regulator. Furthermore the fuel pressure regulator and refuelling connection may be located separately, but local to one another.

In the example shown in FIG. 3 the aircraft refuel connector feeds fuel into a fuel gallery that supplies all of the aircraft's fuel tanks. In an alternative refuelling system separate feed pipework may be supplied for each fuel tank, or separate refuelling connectors may be provided for each tank. Also, a number of refuelling connectors may be provided and connected to a refuelling gallery to allow different refuelling points. Multiple refuelling points may be utilised to increase the rate of refuelling.

The advantages of the embodiment of the invention have been described with reference to a reduction in the refuelling time of an aircraft. A further advantage of the embodiment of the invention is that for a given size of fuel restrictor the maximum pressure rise in the fuel tanks is lowered due to the reduction in maximum possible fuel supply pressure to the fuel flow restrictors. This reduction in maximum fuel tank pressure could allow a less strong, and hence lighter and simpler, fuel tank structure to be utilised. This reduction in fuel tank weight and complexity may reduce the impact of fuel tank design on the overall aircraft design and the reduction in weight provides improved aircraft performance.

The embodiment of the invention has been described with reference to the refuelling of wing and fuselage tanks, but the invention is equally applicable to the refuelling of fuel tanks located elsewhere in an aircraft.

In certain embodiments, the refuelling pipework referred to in the description above of the embodiment of the invention may also be utilised to supply fuel from the fuel tanks to the engines of the aircraft, or to transfer fuel from one fuel tank to another fuel tank. The fuel pressure regulator in such embodiments is positioned at a location in the fuel pipework in which it will not affect the use of the pipework for these other tasks.

The fuel pressure regulator may be either a fixed regulator or a variable regulator. If a variable regulator is utilised the maximum settable pressure of the regulator should be equal to the pressure used to define the fuel flow restrictors to ensure that the maximum safe flow rates are not exceeded if the regulator is adjusted.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft refuelling system of an aircraft, the system comprising
    a refuelling connector mounted as part of the aircraft and configured to detachably connect to a fuel outlet of a fuel supply apparatus separate from the aircraft, and
    a fuel pressure regulator having an inlet in communication with a fuel inlet of the refuelling connector and having an outlet in communication with refuelling pipework of the aircraft, wherein the fuel pressure regulator regulates the maximum pressure of fuel in the refuelling pipework when fuel is being passed into the refuelling pipework from the fuel inlet of the refuelling connector.

2. An aircraft refuelling system according to claim 1, further comprising a fuel flow restrictor mounted in the refuelling pipework to restrict the flow of fuel through the refuelling pipework.

3. An aircraft refuelling system according to claim 2, wherein the size of the fuel flow restrictor is such that the maximum flow rate that would be allowed by the fuel flow restrictor at a fuel supply pressure equal to 50 psig in the absence of the pressure regulator is greater than the maximum flow rate that can be safely sustained by the fuel tanks in the overflowing condition.

4. An aircraft refuelling system according to claim 2, wherein the size of the fuel flow restrictor is such that the maximum flow rate that would be allowed by the fuel flow restrictor at a fuel supply pressure equal to 125% of the maximum pressure allowed by the pressure regulator in the absence of the pressure regulator is greater than the maximum flow rate that can be safely sustained by the fuel tanks in the overflowing condition.

5. An aircraft refuelling system according to claim 1, wherein the fuel pressure regulator is set to regulate the fuel pressure in the refuelling pipework to a maximum pressure, the maximum pressure being between 30 psig and 50 psig.

6. An aircraft refuelling system according to claim 1, wherein the refuelling connector has more than one fuel inlet.

7. An aircraft refuelling system according to claim 1, wherein the fuel pressure regulator is a fixed regulator.

8. An aircraft refuelling system according to claim 1, wherein the fuel pressure regulator is mounted local to the refuelling connector.

9. An aircraft refuelling system according to claim 1, wherein the fuel pressure regulator forms a part of the refuelling connector.

10. A fuel pressure regulator apparatus for mounting in an aircraft, comprising
    a connector forming a fuel inlet to the fuel pressure regulator apparatus, configured to detachably connect to a fuel outlet of a fuel supply system,
    a fuel outlet for connection to the refuelling pipework of an aircraft, and
    a fuel pressure regulator for regulating the maximum pressure of fuel passing through the fuel outlet.

11. A fuel pressure regulator apparatus according to claim 10 having a plurality of connectors.

12. A fuel pressure regulator apparatus according to claim 10 wherein the fuel pressure regulator is configured to regulate the fuel pressure to a maximum pressure, the maximum pressure being between 30 psig and 50 psig.

13. A fuel pressure regulator apparatus according to claim 10 wherein the fuel pressure regulator is a fixed regulator.

14. A method of refuelling an aircraft, comprising the steps of
    supplying fuel to a fuel inlet of an aircraft at a first pressure,
    regulating the maximum pressure of that fuel to a second level with a fuel pressure regulator forming part of the fuel system of the aircraft, and
    supplying the regulated fuel to fuel tanks of the aircraft.

15. A method according to claim 14, wherein fuel is supplied to the fuel inlet of the aircraft by means of a fuel hose comprising a further fuel pressure regulator.

* * * * *